(12) United States Patent
Hohmann et al.

(10) Patent No.: US 9,878,430 B2
(45) Date of Patent: Jan. 30, 2018

(54) TENSIONING DEVICE FOR EXTENDING A THREADED BOLT

(71) Applicants: Jörg Hohmann, Meschede (DE); Frank Hohmann, Warstein (DE)

(72) Inventors: Jörg Hohmann, Meschede (DE); Frank Hohmann, Warstein (DE)

( * ) Notice: Subject to any disclaimer, the term of this patent is extended or adjusted under 35 U.S.C. 154(b) by 733 days.

(21) Appl. No.: 13/929,821

(22) Filed: Jun. 28, 2013

(65) Prior Publication Data

US 2014/0000414 A1 Jan. 2, 2014

(30) Foreign Application Priority Data

Jun. 28, 2012 (DE) .................. 10 2012 105 654

(51) Int. Cl.
| | |
|---|---|
| *B25B 17/00* | (2006.01) |
| *B25B 29/02* | (2006.01) |
| *B25B 13/00* | (2006.01) |
| *B23P 19/06* | (2006.01) |
| *B25B 23/14* | (2006.01) |

(52) U.S. Cl.
CPC ............ *B25B 29/02* (2013.01); *B23P 19/067* (2013.01); *B25B 23/14* (2013.01)

(58) Field of Classification Search
CPC ................................ B25B 29/02; B23P 19/067
USPC ................ 81/57.38, 57.44; 235/37.5; 73/761
See application file for complete search history.

(56) References Cited

U.S. PATENT DOCUMENTS

| | | | | | |
|---|---|---|---|---|---|
| 3,008,362 | A | * | 11/1961 | Tucker, Jr. .............. | B25B 29/02 81/56 |
| 3,679,173 | A | * | 7/1972 | Sherrick ................. | B25B 29/02 254/29 A |
| 3,995,828 | A | * | 12/1976 | Orban ..................... | B25B 29/02 254/29 A |
| 4,185,504 | A | * | 1/1980 | Exner ...................... | G01L 5/24 411/14 |
| 4,773,146 | A | * | 9/1988 | Bunyan ................. | B23P 19/067 29/407.02 |
| 5,249,208 | A | * | 9/1993 | Ruzga ................... | B23P 19/067 376/260 |
| 5,452,629 | A | * | 9/1995 | Heiermann ........... | B23P 19/067 254/29 A |
| 6,843,628 | B1 | * | 1/2005 | Hoffmeister ..... | G06K 19/06009 411/14 |
| 7,703,669 | B2 | * | 4/2010 | Amirehteshami ..... | B21J 15/022 235/375 |

(Continued)

*Primary Examiner* — Bryan R Muller
(74) *Attorney, Agent, or Firm* — Gudrun E. Huckett

(57) ABSTRACT

A tensioning device for extending a threaded bolt by tensioning the threaded end section has a supporting tube surrounding the threaded end section, a cylinder arranged in continuation of the supporting tube and having at least one piston axially movable therein, an exchange socket which is screwable to the threaded end section and is configured such that it can be carried along axially by the piston, and a pin arranged in an axially movable manner in a longitudinal guide in the exchange socket. The pin end is axially supportable against that end of the threaded bolt that has the threaded end section. In order to assess the actually usable thread projection even in cases in which known tensioning devices provide imprecise results, the pin is formed in a radially widened manner at its pin end compared with the pin cross section.

6 Claims, 2 Drawing Sheets

(56) References Cited

U.S. PATENT DOCUMENTS

| | | | |
|---|---|---|---|
| 8,033,181 B2* | 10/2011 | Kibblewhite | G01L 1/255 73/761 |
| 2008/0173140 A1* | 7/2008 | Hohmann | B23P 19/067 81/57.44 |
| 2008/0301926 A1* | 12/2008 | Bucknell | B23P 19/067 29/452 |
| 2011/0271798 A1 | 11/2011 | Wagner et al. | |

* cited by examiner

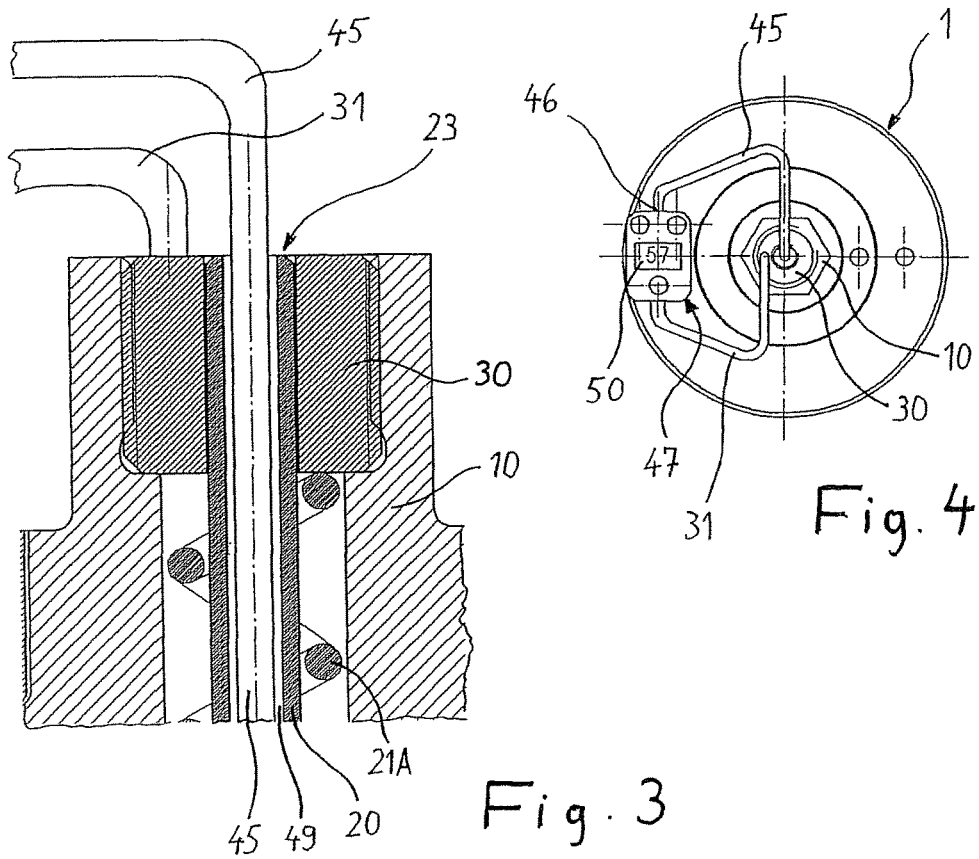
Fig. 3
Fig. 4
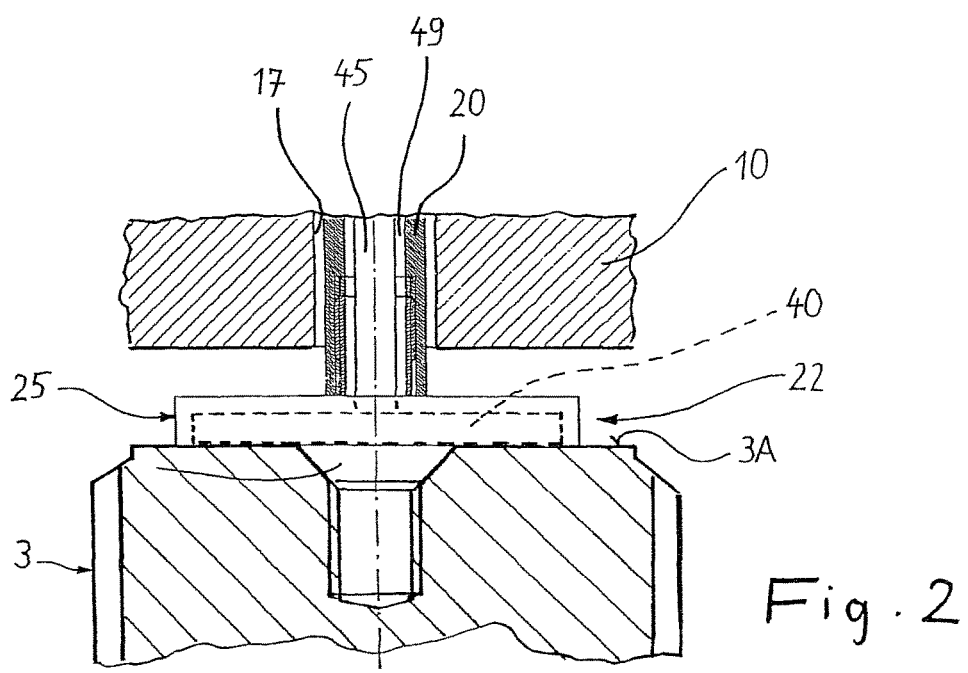
Fig. 2

TENSIONING DEVICE FOR EXTENDING A THREADED BOLT

BACKGROUND OF THE INVENTION

The invention relates to a tensioning device for extending a threaded bolt by way of tension on the threaded end section thereof, having a supporting tube surrounding the threaded end section, a cylinder which is arranged in continuation of the supporting tube and has at least one piston axially movable therein, an exchange socket which is screwable to the threaded end section and is configured such that it can be carried along axially by the piston, and a pin which is arranged in an axially movable manner in a longitudinal guide in the exchange socket and the pin end of which is axially supportable against that end of the threaded bolt that has the threaded end section.

A hydraulically operating bolt tensioning device having these features is known from US 2011/0271798 A1. The tensioning device has measures for monitoring the thread projection, i. e. the length of the threaded end section, gripped by the exchange socket, of the threaded bolt. To this end, the exchange socket is provided with a longitudinal channel in which a measuring rod is fitted in a longitudinally movable manner. The lower end of said measuring rod is supported axially on the end face of the threaded bolt to be tensioned. At its other end, the measuring rod is provided with coloured markings, by way of which it is possible to read, with respect to the exchange socket, whether the thread projection, i. e. the length of the threaded section gripped by the exchange socket, is large enough for the tensioning process. Although the measuring rod according to US 2011/0271798 A1 allows sufficiently precise assessment in many cases, the assessment of the actually used thread projection is imprecise in cases in which the end face of the bolt is not closed, but rather has, for example, a central thread depression in which the lower end of the rod is then supported.

The invention has the object of enabling assessment of the actual thread engagement even in cases in which the known tensioning device provides imprecise results.

SUMMARY OF THE INVENTION

In order to achieve this object, it is proposed, in the case of a tensioning device for extending a threaded bolt by way of tension on the threaded end section thereof having the features specified at the beginning, that the pin is formed in a radially widened manner at its pin end compared with the pin cross section.

As a result of the radial widened section at the lower pin end, the contact between the pin and the bolt to be tensioned always takes place in a single plane, specifically in the plane of the end face of the bolt and thus in that plane as far as which the external thread, available for the tensioning process, of the bolt usually extends. This measure makes it possible to assess the actual length of the thread engagement even in cases in which imprecise evaluation results would otherwise arise, for instance because the bolt has a central thread depression and the lower end of the pin is supported in the latter and not on the actual end face of the threaded bolt.

According to various possible configurations of the tensioning device, the radial widened section may be configured as a disc which is arranged for example fixedly or detachably on the pin end and has a flat or concavely curved underside in the direction of the threaded bolt. Alternatively, the radial widened section may be configured as a socket which is arranged fixedly or detachably on the pin end and is provided with a cutout in the direction of the threaded bolt. The cutout in the socket or the disc provides room for an identification element which operates as a sensor and by way of which features or characteristics of the threaded bolt to be tensioned can be sensed for the purposes of monitoring, evaluation or documentation.

In a further configuration, it is proposed that the widened section is arranged opposite the end face of the threaded bolt and is provided with an identification element which operates as a sensor and senses at least one feature formed on the end face.

Preferably, a signal cable of the identification element is guided along the longitudinal guide of the rod as far as a connection in the cylinder, wherein the connection establishes a signal connection with an evaluation unit. For example, the signal cable can be arranged in a longitudinal channel formed in the rod and thus be guided in a space-saving manner to the connection.

A further configuration of the tensioning device is characterized by means for sensing the longitudinal position of the rod, said means being arranged in the region of the other end, remote from the widened section, of the rod A further configuration of the tensioning device is characterized in that, at the other end of the pin outside the cylinder and inside or outside the exchange socket, the axial vertical movement of the pin is evaluated, inductively or by way of optical means, and displayed.

BRIEF DESCRIPTION OF THE DRAWINGS

Further details and advantages will become apparent from the following description of an exemplary embodiment illustrated in the drawing.

FIG. 2 shows the detail designated II in FIG. 1 on an enlarged scale, wherein the end of the threaded bolt is illustrated in section.

FIG. 3 shows the detail designated III in FIG. 1 on an enlarged scale.

FIG. 4 shows a plan view of the threaded bolt tensioning device.

DESCRIPTION OF PREFERRED EMBODIMENTS

Figure 1:
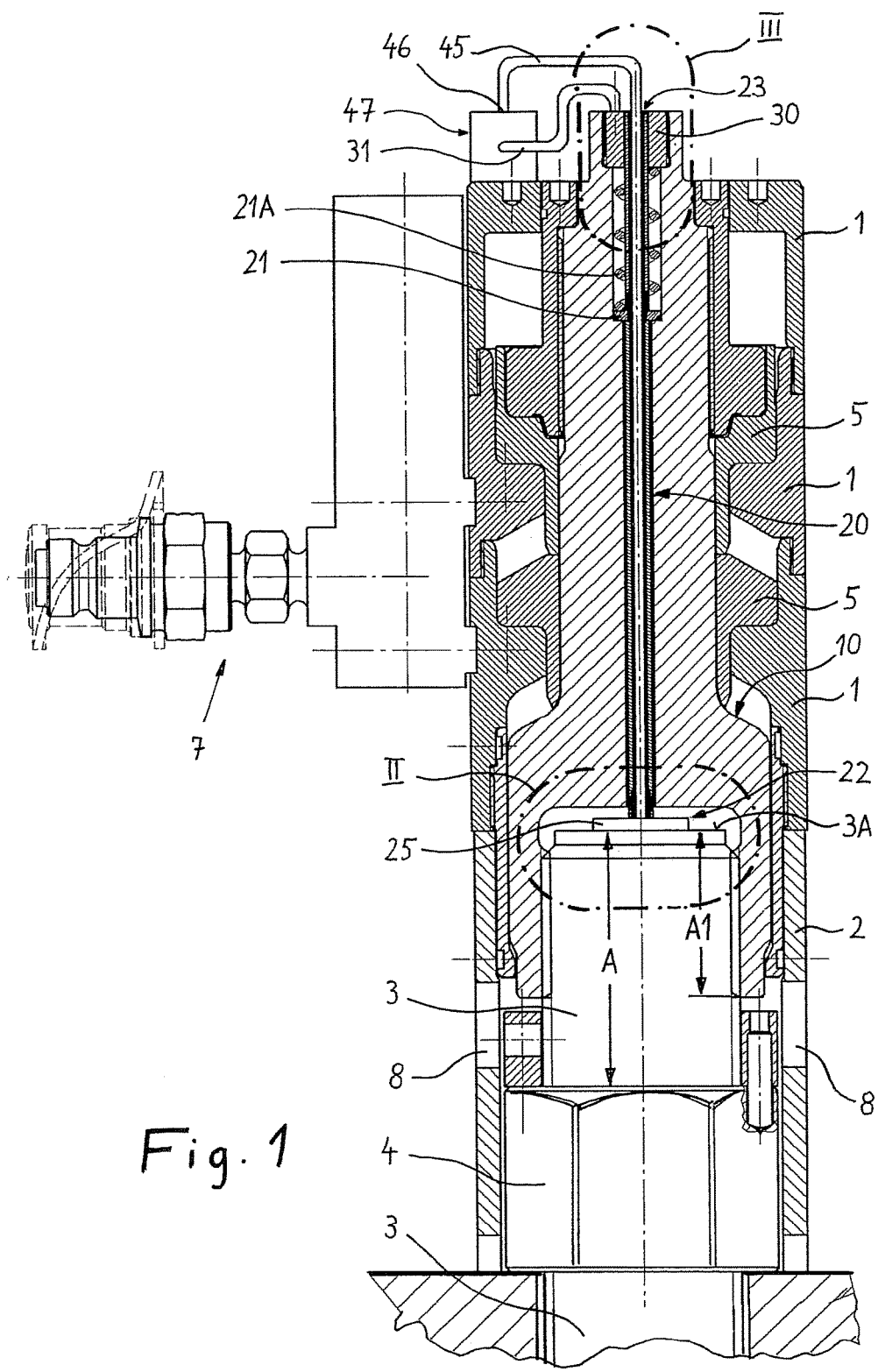
FIG. 1 shows a longitudinal section through a hydraulically operating threaded bolt tensioning device, placed on a threaded bolt secured by a nut.

The hydraulically operated tensioning device serves to tighten and optionally also to release highly stressed screw connections. The tensioning device has the task of applying a predetermined pre-tensioning force onto the threaded bolt 3 for a certain amount of time in the longitudinal direction of the bolt, in order to create the possibility of tightening or retightening in a torque-free manner the nut 4, screwed onto the threaded bolt 3, of the screw connection. For this purpose, an exchange socket of the tensioning device which is described in more detail in the following text is screwed onto the thread, protruding beyond the nut 4, of the threaded bolt 3 and subsequently put under hydraulic tension, as a result of which the threaded bolt 3 is extended in the longitudinal direction.

The screw-in depth of the threaded bolt is limited by the length, which is available as a bolt projection above the nut 4, of the threaded section A. The screw-in-depth available should be at least the same as, and preferably 1.5 times, the thread diameter of the bolt. It is only the minimum screwin-depth that ensures that the threaded bolt 3 is not damaged by the tensioning process. If a minimum value for the length A1 of the thread engagement is not maintained, the threaded bolt end can break off.

The bolt tensioning device has a housing which consists of one or more cylinders 1. The downward continuation of the housing or the cylinders 1 is formed by a supporting tube 2 which is open on its underside and is supported on that base, usually a machine part, on which the nut 4 is also supported. A hydraulic connection 7 is located laterally on the housing composed of the cylinders 1. Furthermore, a gear mechanism which operates through orifices 8 in the supporting tube 2 and by way of which the nut 4 screwed onto the threaded bolt 3 can be rotated may be provided. This rotation is of course only possible when the tensioning device is in operation and therefore the nut 4 is not subjected to considerable frictional loading.

In the exemplary embodiment, the housing contains a plurality of, in this case two, hydraulic cylinders which are connected in parallel and are each connected to the hydraulic connection 7. A piston 5 is arranged in a longitudinally movable manner in each of the cylinders 1. In the exemplary embodiment, these are thus a lower piston 5 and an upper piston 5, which are jointly movable. By feeding hydraulic pressure into the working space of the cylinders, the pistons 5 are raised. This may take place counter to the action of a compression spring supported on the uppermost piston 5.

The pistons 5 are connected rigidly to an exchange socket 10 arranged centrally therein. The movement of the pistons 5 thus results in an identical movement of the exchange socket 10. The latter is designed to be exchangeable by means of suitable measures, and can thus be exchanged for an exchange socket 10 of different geometry, whereas the piston 5 or the pistons 5 are not exchanged for other pistons.

The exchange socket 10 is composed integrally of a lower coupling section and an upper shank section. The coupling section is located inside the supporting tube 2 and has an internal thread which is screwable together with the external thread of the threaded bolt 3. The shank section of the exchange socket 10 is surrounded by the pistons 5, to which it is rigidly connected, preferably by way of a screw connection.

In order to tension the threaded bolt, the exchange socket 10 is screwed onto the threaded end section A of the threaded bolt. By feeding hydraulic pressure, the pistons 5 are raised, carrying along the exchange socket 10, as a result of which longitudinal extension of the threaded bolt 3 occurs. Associated with this is a loss of friction on the underside of the nut 4, such that the latter can be rotated on the thread of the bolt, i.e. can be retightened.

It is important for the tensioning operation that the screw-in depth, made available by the length of the threaded end section A, of the threaded bolt 3 is utilized fully by the corresponding internal thread of the exchange socket 10. In order to monitor the screw-in-depth, a pin 20 is located centrally in a longitudinal bore in the exchange socket 10.

The pin 20 is provided with a collar or a widened section 21, against which a spring 21A, which is supported on the other side opposite the exchange socket 10, is supported. In this way, the pin 20, which is longitudinally movable in the longitudinal guide 17, is always acted on by a force, which pushes it slightly downward, i.e. in the direction of the threaded bolt 3.

At its lower end 22, the pin 20 is supported axially against the end face 3A of the threaded bolt 3. The other end 23 of the pin 20 is located in the region of the upper part of the tensioning device. There, technical measures are taken to sense the longitudinal position of the pin end 23. From this longitudinal position, it is possible to deduce the height at which the lower pin end 22 is located, thereby allowing a direct conclusion to be drawn about the length of the thread engagement A1 at the threaded end section A. Specifically, if, in the situation according to FIG. 1, the length A1 of the thread engagement were less than illustrated, the pin 20 would also be lowered further, and this would be detectable from the position of the upper pin end 23.

In order to detect the height position of the pin 20, means 30 for sensing the longitudinal position of the pin are arranged in the region of the pin end 23. These means 30 are configured to sense the vertical movement of the pin 20, e. g. inductively or by way of optical means. The position signals pass to an evaluation unit 47 via a signal line 31.

In the exemplary embodiment, the evaluation unit 47 is arranged at the top on the housing of the tensioning device, but some other arrangement at some other location is also possible.

At its lower pin end 22, the pin 20 is radially widened compared with the pin cross section of the remaining pin body. For this purpose, the lower pin end is in the form of a disc 25, the radial width of which is greater than the remaining cross section of the pin 20. The widened section 25 formed in this way should not be larger than the size of the end face 3A of the threaded bolt.

FIG. 2 shows details of the lower pin end 22 and the widened section 25 that forms this pin end. The widened section or disc may be an integral part of the pin 20 or an element which is fastened fixedly to the pin 20. As a result of the radial widened section 25, the contact between the pin and the bolt 3 to be tensioned always takes place in a single plane, specifically in the plane of the end face 3A of the bolt.

The widened section 25 makes it possible to assess the length A1 of the actually engaged thread projection even in cases in which imprecise evaluation results would otherwise arise, for instance because the threaded bolt 3 has a central thread depression 3B. Specifically, if the pin 20 were to end in a slender manner at the bottom, it would be supported in the thread depression 3B and not on that end face 3A of the threaded bolt 3, up to the height of which the thread of the threaded bolt 3 frequently extends. Therefore, the radial width of the widened section 25 should be at least the same size as the depression 3B.

According to FIG. 2, an identification element 40 is located in the disc forming the widened section 25, opposite the end face 3A of the threaded bolt 3. In order to accommodate said identification element 40, the widened section 25 may be provided with a correspondingly dimensioned recess.

The identification element 40 is configured to sense at least one feature formed or arranged on the end face 3A of the threaded bolt. This feature may be a marking on the bolt or the screw connection, e. g. a barcode, or the grade of the material of which the threaded bolt consists. However, other markings which are located in the region of the end face 3A may also be detectable by the identification element 40.

The sensor signal of the identification element 40 passes via a signal cable 45 to a connection 46 and from there to an evaluation unit 47. In the exemplary embodiment shown, this is the same evaluation unit 47, having a display element 50, to which the signal line 31 of the means 30 for sensing the longitudinal position of the pin 20 also leads.

In order to accommodate the signal cable 45, the pin 20, which is itself axially guided in the longitudinal guide 17 of the exchange socket 10, is provided with a longitudinal channel 49 preferably arranged on the pin axis. The signal cable 45 coming from the identification element 40 is in this way guided along the pin 20 and passes out of the pin at the upper pin end 23 and leads from there via a further cable section to the connection 46 at the evaluation unit 47.

In the evaluation unit 47, the signals coming from the identification element 40 are evaluated in a suitable manner and optionally further processed. The signals can be displayed by means of the display element 50 or are transmitted to a control unit which is a constituent part of the hydraulic control of the tensioning device. Electronic documentation of the data collected by the identification element 40 can also take place in the evaluation or control unit as part of the documentation of the tensioning process.

The specification incorporates by reference the entire disclosure of German priority document 10 2012 105 654.4 having a filing date of Jun. 28, 2012.

While specific embodiments of the invention have been shown and described in detail to illustrate the inventive principles, it will be understood that the invention may be embodied otherwise without departing from such principles.

LIST OF REFERENCE CHARACTERS 1 cylinder
2 supporting tube
3 threaded bolt
3A end face of threaded bolt
3B depression
4 nut
5 piston
7 hydraulic connection
8 orifice
10 exchange socket
17 longitudinal guide
20 pin
21 widened section
21A spring
22 pin end
23 pin end
25 widened section, disc
30 means for sensing the longitudinal position
31 signal line
40 identification element
45 signal cable
46 connection
47 evaluation unit
49 longitudinal channel
50 display element
  A threaded end section
  A1 length of thread engagement

What is claimed is:

1. A tensioning device for extending a threaded bolt by tensioning the threaded end section thereof, the tensioning device comprising:

a supporting tube surrounding a threaded end section of a threaded bolt;
a cylinder mounted on the supporting tube and coaxially aligned with the supporting tube;
at least one piston axially movable in the cylinder;
an exchange socket adapted to be screwed to the threaded end section and configured such that the exchange socket is carried along axially by the at least one piston;
a pin arranged axially movable in a longitudinal guide of the exchange socket;
the pin having a first pin end that is adapted to be axially supported against an end face of the threaded end section of the threaded bolt;
the pin having a pin body to which the first pin end is connected, wherein the first pin end terminates in a radially widened disc, wherein the disc has a radial cross-section that is wider than a pin cross-section of the pin body, wherein the disc has a diameter larger than a diameter of a centering bore of the end face of the threaded end section, wherein the disc is provided with a recess facing in the direction of the threaded bolt and a circumferential rim surrounding the recess and extending axially in the direction toward the threaded bolt, wherein the recess is configured to accommodate an identification element, wherein the circumferential rim comprises a rim end face and the rim end face, when the tensioning device is positioned on the threaded bolt for tensioning the threaded end section, rests directly against the end face of the threaded end section at a radial spacing from the centering bore of the end face of the threaded end section.

2. The tensioning device according to claim 1, wherein the identification element accommodated in the recess operates as a sensor and senses at least one feature formed on the end face of the threaded end section of the threaded bolt.

3. The tensioning device according to claim 2, wherein the identification element has a signal cable that is guided along the longitudinal guide as far as a connection provided in or on the cylinder, wherein the connection establishes a signal connection with an evaluation unit.

4. The tensioning device according to claim 3, wherein the signal cable is guided in a longitudinal channel formed on the pin.

5. The tensioning device according to claim 1, further comprising means for sensing the longitudinal position of the pin, said means being arranged in the region of a second pin end that is remote from the radial widened section of the first pin end.

6. The tensioning device according to claim 1, wherein the pin has a second pin end opposite the first pin end, wherein at the second pin end, outside the cylinder and inside of the exchange socket, the axial vertical movement of the pin is evaluated, inductively or by optical means, and is displayed.

* * * * *